US011015961B2

(12) United States Patent
Handerek et al.

(10) Patent No.: US 11,015,961 B2
(45) Date of Patent: May 25, 2021

(54) DISTRIBUTED OPTICAL FIBRE SENSORS (71) Applicant: Fotech Group Limited, Church Crookham (GB)

(72) Inventors: Vincent Handerek, Grays (GB); Adrian Steel, Sandhurst (GB)

(73) Assignee: FOTECH GROUP LIMITED

( * ) Notice: Subject to any disclaimer, the term of this patent is extended or adjusted under 35 U.S.C. 154(b) by 0 days.

(21) Appl. No.: 16/748,337

(22) Filed: Jan. 21, 2020

(65) Prior Publication Data
US 2020/0173818 A1 Jun. 4, 2020

Related U.S. Application Data (62) Division of application No. 16/070,922, filed as application No. PCT/GB2017/050083 on Jan. 13, 2017, now Pat. No. 10,584,982.

(30) Foreign Application Priority Data

Jan. 20, 2016 (GB) ...................................... 1601060

(51) Int. Cl.
*G01D 5/353* (2006.01)
*G01B 11/16* (2006.01)
*G01H 9/00* (2006.01)
*G01K 11/32* (2021.01)

(52) U.S. Cl.
CPC ......... *G01D 5/35361* (2013.01); *G01B 11/16* (2013.01); *G01D 5/35358* (2013.01); *G01D 5/35383* (2013.01); *G01D 5/35396* (2013.01); *G01H 9/004* (2013.01); *G01K 11/32* (2013.01)

(58) Field of Classification Search
None
See application file for complete search history.

(56) References Cited

U.S. PATENT DOCUMENTS

| 4,459,477 A | * | 7/1984 | Asawa | ..................... G01L 1/245 |
| | | | | 250/227.16 |
| 4,823,166 A | | 4/1989 | Hartog et al. | |
| 5,178,465 A | | 1/1993 | Amano et al. | |
| 5,491,573 A | * | 2/1996 | Shipley | .............. G01M 11/3136 |
| | | | | 356/73.1 |
| 7,283,216 B1 | * | 10/2007 | Geng | ..................... G01B 11/18 |
| | | | | 356/35.5 |

(Continued)

FOREIGN PATENT DOCUMENTS

| DE | 102010049780 A1 | 5/2012 |
| EP | 0411956 A2 | 2/1991 |

(Continued)

OTHER PUBLICATIONS

PCT International Search Report and Written Opinion of the International Searching Authority for International Patent Application No. PCT/GB2017/050083, dated Jun. 6, 2017, 17 pages.

(Continued)

*Primary Examiner* — Shawn Decenzo
(74) *Attorney, Agent, or Firm* — K&L Gates LLP (57) ABSTRACT

There is disclosed a distributed optical fibre sensing system in which the sensor fibre comprises at least first and second waveguides used for separate sensing operations. The sensor fibre may be, for example, a double clad fibre having a monomode core and a multimode inner cladding.

20 Claims, 6 Drawing Sheets

(56) References Cited

U.S. PATENT DOCUMENTS

| | | | |
|---|---|---|---|
| 8,520,197 B2* | 8/2013 | Handerek | G01V 1/226 |
| | | | 356/73.1 |
| 8,655,167 B1* | 2/2014 | Lam | H04J 14/0227 |
| | | | 398/21 |
| 10,033,153 B1* | 7/2018 | Nguyen | H01S 5/0687 |
| 10,209,060 B1* | 2/2019 | Nguyen | G01B 11/165 |
| 2006/0188256 A1* | 8/2006 | Hall | H04B 10/508 |
| | | | 398/45 |
| 2009/0263123 A1* | 10/2009 | Zhu | H04B 10/071 |
| | | | 398/16 |
| 2009/0324161 A1 | 12/2009 | Prisco | |
| 2010/0066997 A1* | 3/2010 | Conner | G01M 11/3154 |
| | | | 356/73.1 |
| 2011/0085158 A1 | 4/2011 | Motter et al. | |
| 2011/0249973 A1* | 10/2011 | Donlagic | G01J 9/0246 |
| | | | 398/79 |
| 2012/0127459 A1* | 5/2012 | Handerek | G01D 5/353 |
| | | | 356/73.1 |
| 2012/0224182 A1* | 9/2012 | Tapanes | G01B 9/02079 |
| | | | 356/477 |
| 2014/0146312 A1* | 5/2014 | Perron | G01M 11/3118 |
| | | | 356/73.1 |
| 2015/0086206 A1* | 3/2015 | Goldner | G01D 5/35306 |
| | | | 398/84 |
| 2017/0248448 A1* | 8/2017 | Horiguchi | H01S 5/0071 |
| 2017/0299463 A1* | 10/2017 | Lecoeuche | G01M 11/3181 |
| 2018/0058983 A1* | 3/2018 | Moore | G01M 11/3172 |
| 2018/0073959 A1* | 3/2018 | Lecoeuche | G01K 11/32 |
| 2018/0113037 A1* | 4/2018 | Molteni | G01L 1/247 |
| 2018/0143041 A1* | 5/2018 | Johnston | G01V 8/14 |
| 2018/0274907 A1* | 9/2018 | Sato | G01M 11/31 |
| 2018/0316419 A1* | 11/2018 | Watte | H04J 14/0227 |
| 2018/0340801 A1* | 11/2018 | Kelley | G01H 9/004 |
| 2018/0356263 A1* | 12/2018 | Nielsen | G01D 5/35383 |
| 2019/0094459 A1* | 3/2019 | Froggatt | G01B 11/161 |
| 2019/0234726 A1* | 8/2019 | Gifford | G01B 11/26 |
| 2019/0277709 A1* | 9/2019 | Miller | G01K 13/00 |

FOREIGN PATENT DOCUMENTS

| | | |
|---|---|---|
| EP | 2623948 A1 | 8/2013 |
| WO | 00/62033 A1 | 10/2000 |
| WO | 2008/056143 A1 | 5/2008 |
| WO | 2011/010110 A2 | 1/2011 |
| WO | 2011/148128 A1 | 12/2011 |
| WO | 2015/004487 A2 | 12/2011 |
| WO | 2013/123656 | 8/2013 |
| WO | 2015/017270 | 2/2015 |
| WO | 2016/012760 A2 | 1/2016 |

OTHER PUBLICATIONS

Bao et al., "Recent Progress in Distributed Fiber Optic Sensors", Sensors 2012, 12, 8601-8638.

Horiguchi et al., "Development of a Distributed Sensing Technique Using Brillouin Scattering", Journal of Lightwave Technology, 13(7):1296-1302, Jul. 1995.

Rogers, Polarimetric Distributed Optical Fiber Sensing, Optical Fiber Sensor Technology, vol. 3, edited by Grattan et al., Kluwer Academic Publishers, London, pp. 159-182, 1998.

Xu et al., "The Resilient Hybrid Fiber Sensor Network with Self-Healing Function", Review of Scientific Instruments, 2015, 86, 033111-1-033111-5.

UK Search Report for Application No. GB1601060.5, dated Jul. 8, 2016, 5 pages.

* cited by examiner

DISTRIBUTED OPTICAL FIBRE SENSORS

CROSS REFERENCE TO RELATED APPLICATIONS

This application is a divisional of U.S. patent application Ser. No. 16/070,922 filed on Jul. 18, 2018, which claims priority to International Application No. PCT/GB2017/050083, filed on Jan. 13, 2017, which claims priority to and benefit of United Kingdom Patent Application No. 1601060.5, filed on Jan. 20, 2016, the entire disclosures of each of which are hereby incorporated by reference.

The present invention relates to sensors using multiple optical fibres. Aspects of the invention relate in particular to distributed optical fibre sensors in which one or more physical parameters are sensed as a function of position along a plurality of sensing optical fibres from properties of probe light backscattered within the sensing fibres. Such sensors may for example be optical time domain reflectometry (OTDR) sensors for use in sensing acoustic vibration or other physical parameters, and such sensors which use phase sensitive OTDR techniques such as through the detection of coherent Rayleigh noise, or other interferometric techniques.

INTRODUCTION

Distributed optical fibre sensing is a well known approach to providing information about environmental conditions proximal or adjacent to a sensing optical fibre, and avoids the need to use point sensor structures at particular locations such as sensor structures coupled to the optical fibre, or Bragg gratings written into the optical fibre. Fully distributed optical fibre sensing can, in principle, provide spatially resolved information from every point along the sensing optical fibre. Variables that can be sensed include temperature, static strain, pressure, and vibration.

One such technique detects variations in refractive index, induced by a physical forcing such as vibration, in the coherent Rayleigh noise profile of light backscattered within a sensing optical fibre interrogated by an optical source of limited bandwidth. Such Rayleigh noise profiles arise from interference between the many components of the backscattered light originating from different points along a portion of the sensing optical fibre illuminated by the optical source. Such techniques are described, for example, in WO2008/056143.

Another such technique detects variations in fibre temperature and strain through their effects on Brillouin scattering of probe light launched into the fibre, Such techniques are described, for example, in Horiguchi et al., Journal of Lightwave Technology, vol. 13, no. 7, July 1995.

It would be desirable to address problems and limitations of the related prior art.

SUMMARY OF THE INVENTION

Distributed optical fibre sensing systems, for example such systems arranged to sense vibration in an environment, typically comprise at least three main elements. Firstly, a sensing optical fibre is deployed in an environment where vibration is to be monitored, such as in a geological well, through a building, along or through a structure such as a pipeline or aircraft, or through the ground. Secondly, an optical interrogator unit is optically coupled to the sensing optical fibre, injecting probe light into the fibre, receiving the probe light backscattered within the fibre, and converting the received light into time-varying electrical signals. Thirdly, the sensing system typically includes a signal processor that automatically converts the electrical signals into information about the environmental effects, such as vibrations, temperature or static pressure, acting on the sensing optical fibre. Since the optical interrogator typically outputs either large volumes of digital data or high bandwidth analogue signals, the signal processor is normally located close to the interrogator in order to avoid signal transmission problems. Both the optical interrogator and the signal processor are typically costly elements of the system, while the sensing optical fibre tends to be susceptible to damage and degradation during the lifetime of the system, but is frequently very inaccessible and therefore difficult or impossible to repair or replace.

The effects of fibre damage and degradation mentioned above can often be ameliorated by providing multiple alternative choices of sensing fibres within the monitored environment. In order to avoid unnecessary cost, a single optical interrogator can be connected to a set of sensing fibres via an optical switch. In the particular case of distributed vibration or acoustic sensing, it can be very advantageous to employ a fast optical switch, as described in patent application PCT/GB2015/052071. While this approach can improve the resilience of the sensing system by providing fibre redundancy, the invention seeks to make further gains in resilience by anticipating the failure of interrogator units and by allowing for the parallel installation of interrogators with enhanced performance features that might extend the usefulness and service lifetime of damaged or degraded fibres.

Another limitation of the prior art architectures of distributed optical fibre vibration sensors is that each interrogator unit is typically used with only one, or at most two, co-located signal processor units. Thus a failure of a signal processor unit will typically incapacitate the system. Even without considering processor failures, it is often true that the processing requirements of the signals from distributed vibration sensors are very onerous, particularly when real-time interpretation of signals is required. The invention therefore aims to increase the speed and capacity of such signal processing systems. This can be achieved by splitting up different processing tasks in parallel between different physical processing hardware units such that the processing rate can be increased and so that different analyses can be applied simultaneously. Thus in order to protect against processor failure and to increase processing capacity, the invention provides arrangements for using alternative signal processor units with any given interrogator unit.

A further limitation of the prior art arises from the fact that the signal processor units required by distributed optical fibre sensors can require large power supplies for their operation. This normally restricts the siting of signal processor units to locations where mains power supplies are available and precludes any realistic possibility of using power from local, independent power sources such as solar photovoltaic installations. Such installations would however be compatible with the power requirements of independent optical interrogator units. The best flexibility for siting of interrogators would therefore be provided if the signal processor and optical interrogator units could be located independently, without the need for physical proximity. It is an additional objective of the present invention to provide this flexibility.

Responsive to the above constraints, the invention seeks to optimize distributed vibration sensing system design by adopting a strategy for interconnecting sensing fibres, optical interrogators and electronic processing units with the greatest potential for reconfigurability and proper application of specialized hardware capabilities. This approach optimizes the system performance and resilience while minimizing the number of specialized processor and interrogator units required, thus also minimizing the overall cost of the installation.

When distributed optical fibre sensing fibres are clustered in locations near to each other, it can be permissible to reduce costs by sharing an interrogator between sensing optical fibres on a planned schedule. This situation may arise, for example, while monitoring fluid flow on an oil or gas production platform. This can be accomplished using a 1:M optical multiplexing switch. Distributed vibration sensors typically rely on detection of Rayleigh backscatter or other weak signals from the sensing fibres. These signals are usually extremely weak and need to be accurately measured quickly enough to resolve vibrations in the acoustic, for example the kilohertz range, so the photodetection system must be extremely sensitive.

However, photodetection systems with such great sensitivity are susceptible to severe disruption by strong optical signals, however brief, even lasting only for nanoseconds or less. The strong pulses launched by the interrogator into the sensing fibre can therefore easily give rise to such disruption. Due to localised defects, breaks or other issues, some sensing optical fibres in a cluster may generate discrete reflections of the pulses launched by the interrogator. These reflections can be thousands of times stronger than the desired Rayleigh backscatter signal and so can disrupt the operation of the photodetection system in the interrogator. This problem can be addressed by the use of a special interrogator designed to tolerate such reflections, but aspects such as the cost, complexity, power consumption, and maintenance requirements of such an interrogator might be increased compared to a standard, more general purpose unit.

Fibres installed in hostile locations such as oil wells are often seen to degrade over long periods of time, typically over months to years. One common form of degradation is for the attenuation of the fibre to increase gradually. If such a fibre were to be used within a monitoring schedule as described above, the sensing performance of the highly attenuating fibre would inevitably be reduced compared to lower loss fibres in the cluster. One way to combat this problem is to increase the optical power launched into the more highly attenuating fibre. Alternatively, an interrogator incorporating ultra-sensitive photodetection capability could also be used, or even better an interrogator incorporating both features. Once again, a specialized interrogator could be installed to provide the required features, but this might again be more costly in terms of money, complexity and other factors than a standard interrogator.

In both of the cases described above, it is advantageous to connect the cluster of sensing fibres to more than one interrogator unit, where the different interrogator units may offer different features, such as tolerance to strong reflections or high attenuation. The invention described herein therefore proposes use of an N:M optical switch between the interrogators and the sensing optical fibres in order to achieve the desired connections flexibly and reconfigurably under programmable and therefore automatic control.

When an N:M optical matrix switch is used as suggested above, then in the case of a fault or breakdown of one interrogator, an alternative working unit can be used to provide sensing capability, for example until the failed unit is replaced. In other circumstances, more than one interrogator might be required in order to provide a sufficient monitoring frequency for all of the sensing fibres. Once again, in the case of a fault or breakdown in one interrogator, the invention provides a capability for remaining working interrogators to provide sensing coverage for the entire cluster of fibres, for example until the broken interrogator is repaired or replaced. In both of the situations described, optical flexibility is maximised by connecting the set of interrogators to the set of sensing fibres using an N:M optical switch, such as an optical matrix switch, such that N interrogators can be connected to any of M sensing fibres.

The invention therefore provides a distributed optical fibre sensor for sensing an environment, as a function of position along each of a plurality of sensing optical fibres passing through the environment, from properties of probe light backscattered within the sensing optical fibres. The sensor comprises a plurality of interrogator units, each interrogator unit comprising a probe light source arranged to generate pulses of probe light for transmission to a sensing optical fibre when coupled to the interrogator unit, and a detector arranged to receive and detect probe light backscattered within the coupled sensing optical fibre. The sensor also comprises an optical switch arranged to selectively and simultaneously couple each of a plurality of the interrogator units to each of a plurality of the sensing optical fibres such that probe light pulses from each coupled interrogator unit are directed into the correspondingly coupled sensing optical fibre, and backscattered probe light from the sensing optical fibre is directed back to the correspondingly coupled interrogator unit.

The distributed optical fibre sensor is typically arranged to sense the environment as a concurrent function of position along each of one or more of the sensing optical fibres. This can be achieved in various ways, but typically may be carried out by generating probe light pulses using a laser source of limited or narrow bandwidth, so that coherent Rayleigh scattering takes place within the sensing optical fibre and a coherent Rayleigh profile of the backscattered probe light is output by the detector. In particular, sensing the environment may comprise sensing acoustic vibration at one or more of the sensing optical fibres, for example using such Coherent Rayleigh backscatter techniques. Other measurands of the environment sensed by the sensor may comprise one or more of temperature, pressure, and strain at one or more of the sensing optical fibres.

Although an interrogator or interrogator unit may be defined as a combination of at least one probe light source and at least one detector arranged for coupling to a single sensing optical fibre at any one time, it should be noted that multiple such interrogators or interrogator units could be housed in corresponding multiple discrete casings, or multiple such interrogators or units could be grouped together in one or more common casings, in which case it may be appropriate for such co-housed interrogator units to share some common components if appropriate to the design, such as power supplies, some optics elements, computer processing facilities and so forth.

The sensor may be arranged to automatically change the coupling of a particular sensing optical fibre from a first of the interrogators to a second of the interrogators, using the optical switch, for example under computer program control, and such control may be effected by computer software executing as part of the sensor itself, or under outside control. Similarly, the sensor may be arranged to automatically change the coupling of a particular interrogator from a first of the sensing optical fibres to a second of the sensing optical fibres, using the optical switch, for example under computer program control, and such control may be effected by computer software executing as part of the sensor itself, or under outside control.

More particularly, the sensor may comprise an interrogator fault sensing function arranged to output an indication of a fault in one or more of the interrogators, the sensor being arranged to automatically change the coupling of a sensing optical fibre from an interrogator indicated as faulty by the interrogator fault function to a different interrogator. Note that an interrogator detected as faulty could be completely incapacitated and not responsive to control communications, could be still operating but in a manner which fails to produce useful data for example because the light source has partly or completely failed or is no longer operating within a required regime, or is still functional but at a reduced level of effectiveness, for example outputting a weaker or noisier signal than normal, outputting a signal in which the timing or distance accuracy is reduced or compromised, and so forth. Other components of the interrogator which deteriorate or otherwise lead to a faulty interrogator include optical amplifiers, connectors, modulators, photodetectors, and power supplies.

Similarly, the distributed optical fibre sensor may further comprise a fibre degradation sensing function arranged to output an indication of a degradation of any of said sensing optical fibres, the sensor being arranged to automatically change the coupling of a sensing optical fibre indicated as degraded from a currently coupled interrogator to a different interrogator responsive to the indication of degradation, or to automatically change the coupling of an interrogator from a sensing optical fibre indicated as degraded to another sensing optical fibre, for example one that isn't degraded. For example, it may be desirable to couple the interrogator to another sensing optical fibre which resides in the same cable, or follows the same route through the environment, as the degraded optical fibre. Degradation of a sensing optical fibre may typically be manifested as a gradual increase in transmission loss along some or all of the fibre. Degradation in a sensing optical fibre may also occur by way of degradation in the mechanical coupling of the sensing optical fibre to the environment, rather than or as well as degradation to the material of the fibre itself.

Similarly again, the distributed optical fibre sensor may further comprise a fibre defect sensing function arranged to output an indication of a localised defect in any of said sensing optical fibres, the sensor being arranged to automatically change the coupling of a sensing optical fibre indicated as having a localised defect from a currently coupled interrogator to a different interrogator responsive to the indication of a localised defect, and/or to automatically change the coupling of an interrogator from a sensing optical fibre indicated as having a localised defect to another sensing optical fibre, for example one that doesn't have or isn't indicated as having a localised defect. For example, it may be desirable to couple the interrogator to another sensing optical fibre which resides in the same cable, or follows the same route through the environment, as the degraded optical fibre. A localised fibre defect may typically comprise a fibre break or defect leading to a localised strong reflection of the probe light signal.

The distributed optical fibre sensor may also or instead be arranged to control the optical switch so as to interleave backscattered light from a particular sensing optical fibre between two or more of said interrogators such that said two or more interrogators are used concurrently to sense the environment proximal to the particular sensing optical fibre. This technique could be used, for example, to make use of interrogators with slower data processing or output rates, or with limited laser duty cycles.

The optical switch can be provided in a variety of forms, but in some examples it may be a non-blocking mechanical action optical matrix switch, in which switch elements such as mirrors are mechanically moved, for example rotated or translated, in order to change the switch configuration.

In other examples an interrogator switch element is associated with each of a plurality of said interrogators, a sensing fibre switch element is associated with each of a plurality of said sensing optical fibres, and optical interconnections between said switch elements are selectable by the switch elements to selectively and simultaneously couple each of a plurality of the interrogators to each of a plurality of the sensing optical fibres. Such arrangements may conveniently be implemented using solid state switches for either or both of the interrogator and sensing fibre switch elements.

To help avoid reflections of probe light pulse power from the solid state switch elements back towards the detector, one or more of the selectable interconnections between the switch elements may each be at least one half of the length of probe light pulses which the connected interrogators are arranged to generate. Alternatively, the invention may provide that one or more of these interconnections is at least of a certain length to help avoid such reflections, such as for example at least 50 cm, at least 1, 2 or 5 metres, depending for example on the expected pulse lengths.

Each sensing optical fibre may be deployed, for sensing the environment, within a separate fibre optic cable disposed within the environment. Each fibre optic cable may be deployed, at least partly, along a different path through the environment from the other fibre optic cables, so as to sense the environment in different parts of the environment than each of the other fibre optic cables. The sensor may comprise at least three, or at least four such fibre optic cables or sensing optical fibres, and may comprise at least three, or at least four interrogators or interrogator units.

In some embodiments, two or more of the sensing optical fibres may be disposed in each of one or more fibre optic cables disposed within the environment.

The invention also provides methods of operating, methods of constructing, and methods corresponding to the above apparatus. For example, the invention also provides a method of operating a distributed optical fibre sensor to sense an environment as a function of position along each of a plurality of sensing optical fibres coupled to, passing through, or proximal to the environment, from properties of probe light backscattered within the sensing optical fibres, the method comprising: using a plurality of interrogators each to generate pulses of probe light for transmission to a different coupled sensing optical fibre and each to receive and detect probe light backscattered within the correspondingly coupled sensing optical fibre; and using an optical switch arranged to selectively and simultaneously couple each of a plurality of the interrogators to each of a plurality of the sensing optical fibres, such that probe light pulses from each coupled interrogator are directed into the correspondingly coupled sensing optical fibre, and backscattered probe light from the sensing optical fibre is directed back to the correspondingly coupled interrogator.

The method may then further comprise automatically changing the coupling of a particular sensing optical fibre from a first of the interrogators to a second of the interrogators, using the optical switch, for example under programmatic control of software which may also be executing within or under the control of the sensor.

Such programmatic control may be responsive to aspects of the backscatter signal detected by the interrogators, or other data available regarding the operation or performance of the interrogators and/or sensing optical fibres. For example, the method may comprise automatically changing the coupling dependent on one or more of: detection by the sensor of an interrogator as faulty; a detection by the sensor of degradation of a sensing optical fibre; and detection by the sensor of a localised defect in a sensing optical fibre.

The invention also provides aspects which address the flexibility and adaptability of parts of the sensor arranged to carry out signal processing on the backscatter signal output by the interrogators. For example, the invention provides a distributed optical fibre sensor for sensing an environment, as a function of position along each of a plurality of sensing optical fibres passing through the environment, from properties of probe light backscattered within the sensing optical fibres, the sensor comprising: a plurality of interrogators, each interrogator comprising a probe light source arranged to generate pulses of probe light for transmission to a sensing optical fibre coupled to the interrogator, and a detector arranged to receive and detect probe light backscattered within the sensing optical fibre and being arranged to output a signal corresponding to the detected probe light; a plurality of signal processors, each signal processor arranged to receive an output signal from one or more of the plurality of interrogators, and to derive from the output signal one or more parameters of the environment proximal to the coupled sensing optical fibre.

The distributed optical fibre sensor may then further comprise a virtual processor environment, wherein the plurality of signal processors are implemented in a plurality, or a corresponding plurality of virtual processors executing within the virtual processor environment.

The distributed optical fibre sensor may comprise a data switching facility arranged to couple the plurality of interrogators to the plurality of signal processing units. Such a data switching facility can then be used to change the configuration of connections between the interrogators and signal processors, and/or to change the provision of signal processors for example in terms of numbers, computer processing resources dedicated to those processors and similar. For example, the data switching facility may be arranged to automatically reroute a signal from a particular interrogator from a current signal processor to a different signal processor.

The invention also provides computer program code arranged to implement the data processing aspects of the invention described herein when executed on suitable computer processing apparatus, and computer readable media and memory apparatus carrying such computer program code.

BRIEF SUMMARY OF THE DRAWINGS

Embodiments of the invention will now be described, by way of example only, with reference to the drawings, of which.

DETAILED DESCRIPTION OF EMBODIMENTS

Figure 1:
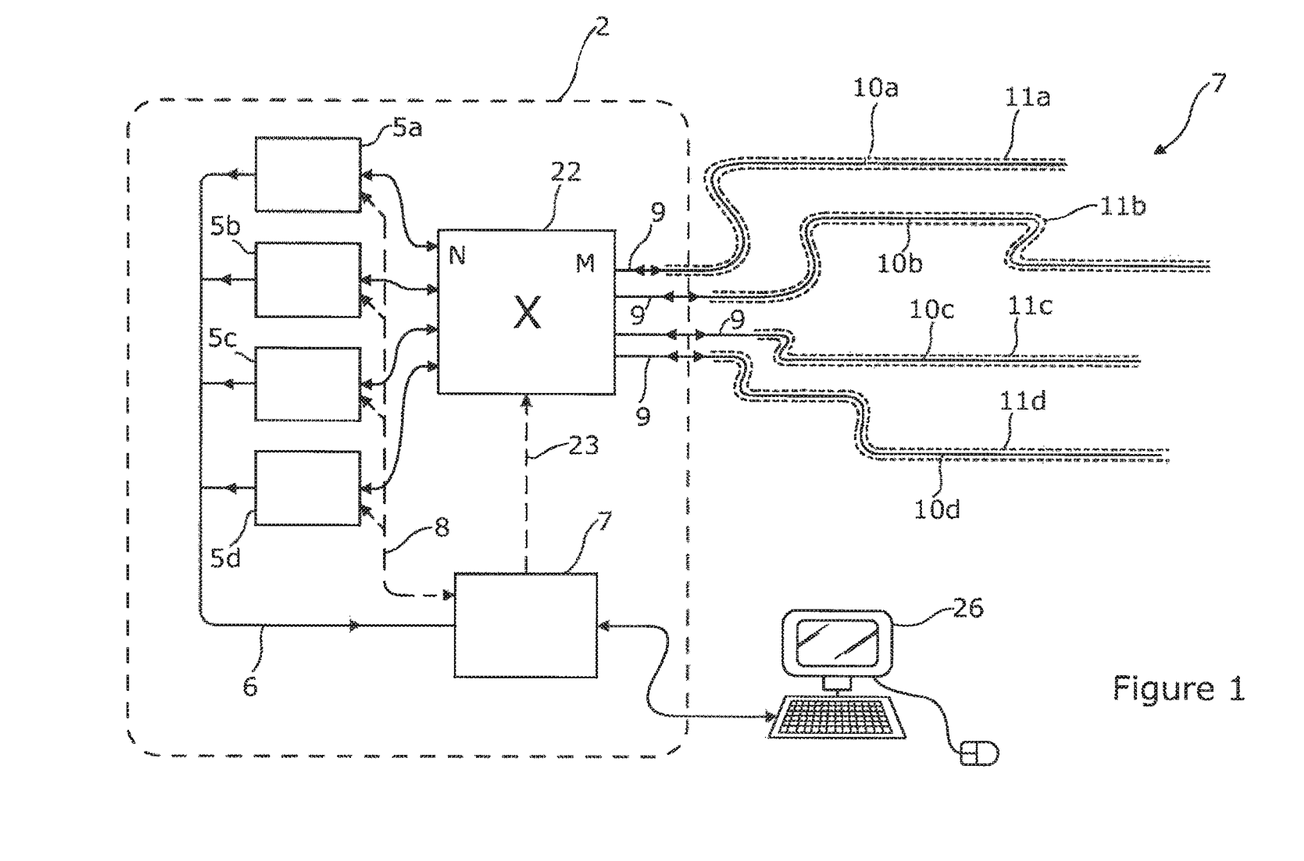
FIG. 1 shows schematically a distributed optical fibre sensor according to embodiments of the invention.

Referring to FIG. 1 there is illustrated a distributed optical fibre sensor 2 arranged to sense one or more physical parameters of an environment 7 as a function of position along part or all of each of a plurality of sensing optical fibres 10a-10d, using optical time domain reflectometry (OTDR), or another reflectometry technique such as frequency domain reflectometry. The sensing optical fibres may be deemed part of the sensor 2. The sensor comprises a plurality of interrogator units 5a-5d which are optically coupled to the plurality of sensing optical fibres 10a-10d via an optical switch 22 which is preferably arranged to selectively couple any one of the interrogators to any one of the sensing optical fibres. In this way, probe light pulses from any one of the interrogators are directed into a correspondingly coupled sensing optical fibre, and backscattered probe light from that sensing optical fibre is directed back to the coupled interrogator, to thereby effect the sensing function through the properties of the backscatter of the probe light. Outputs of the interrogators comprise data streams 6 representing the detected backscatter, and these data streams 6 are passed to one or more management units 7 for signal processing and further operations as discussed below.

In particular, the optical switch 22 may be arranged to simultaneously couple each of a plurality (which could be all) of the interrogators, to a different one of the sensing optical fibres, and/or to simultaneously couple a plurality (for example all) of the sensing optical fibres, each to a different one of the interrogators. There may be the same number of interrogators as sensing optical fibres, or more, or fewer, as desired depending on the required system and other constraints as discussed further below. The number of interrogators and/or sensing fibres available for use or which are to be coupled may vary over time during the normal course of operation of the sensor. Not all of the interrogators need be coupled to any sensing optical fibre at any particular time, and not all of the sensing optical fibres need to be coupled to an interrogator at any particular time.

The optical switch may be controlled by the one or more management units 7 which are arranged to generate a switch control signal 23 to cause the switch 22 to simultaneously couple a plurality of the interrogators each to a different one of the sensing optical fibres, and to change which interrogator is coupled to which sensing optical fibre from time to time as desired. As discussed in more detail below, changes in the coupling may be effected automatically by the one or more management units 7 consequent upon detecting that a particular interrogator is faulty, or that a particular fibre would best be coupled to a different interrogator due to changes in the properties of the fibre such as increased attenuation. Changes to the coupling may also or instead be carried out based on instruction of a user.

The one or more management units 7 may also control aspects of the operation of the interrogators, and receive operational status data regarding the interrogators, using interrogator control signal(s) 8. The one or more management units 7 may also comprise or provide signal processing facilities or elements for processing digital or analogue backscatter data 6 received from the interrogators.

FIG. 1 also illustrates a user interface device 26, for example provided using a personal computer or computer device or system, which comprises suitable display and user input means such as a screen, mouse and keyboard. The user interface device is coupled to the one or more management units 7, in order to receive data from the management units for display. Such data may represent said detected physical parameters of the environments 7 of the sensing optical fibres, and/or data derived therefrom such as alerts indicating particular detected conditions of those environments, data representing performance and/or operation of the sensor 2 and/or the sensing optical fibres, and so forth. The user interface device 26 may also be used to enable a user to control aspects of the sensor, by providing suitable instructions to the one or more management units 7. Of course, although shown separately in FIG. 1, the user interface device 26 could be provided in part or whole by one or more of the management units 7 or in some other combination with data processing facilities of the sensor.

The sensing optical fibres 10a-10d may all be of the same type and/or specification of optical fibre, or may be of different types and/or specifications including, without limitation, combinations and variations of single mode fibre; multimode fibre; fibre with high birefringence; fibre especially adapted or encased so as to respond or enhance the response to changes in one or more of pressure, temperature, vibration, and other environmental parameters which are to be measured; cross sectional dimensions or core and cladding; refractive index structure; beat length; overall length; average attenuation and so forth. Some or all of the sensing optical fibres may also all be coated and/or comprised within cable structures in various ways. Different coatings and cable structures may, for example, provide different modes and degrees of coupling to the environment, and different degrees of protection. Typically, however, the sensing optical fibres may be single mode optical fibres with attenuation of about 0.2 dB/km, up to about 10 km in length, and installed down hole in well bores of various kinds, such as oil and gas wells.

Each sensing optical fibre may be housed in a different fibre optic cable 11a-11d, which typically will provide physical protection to the housed sensing optical fibre, while coupling the optical fibre suitably to the environmental parameter(s) to be sensed. In this way, each fibre optical cable, and therefore each sensing optical fibre may be deployed at least partly along a different path through the environment 7 to be sensed, so that each sensing optical fibre, at least in part, senses the one or more physical parameters in different parts of the environment to the other sensing optical fibres.

Each sensing optical fibre 10a-10d may be coupled to the interrogator 5 by a length of down lead section 9 of the sensing optical fibre, which is not used for sensing the environment. This is illustrated schematically in FIG. 1 by different lengths of optical fibre before the respective cable 11a-11d is entered, but note that a down lead section 9 of a sensing optical fibre could also or instead be considered as a part of the sensing optical fibre which is housed within the respective fibre optical cable.

Figure 2:
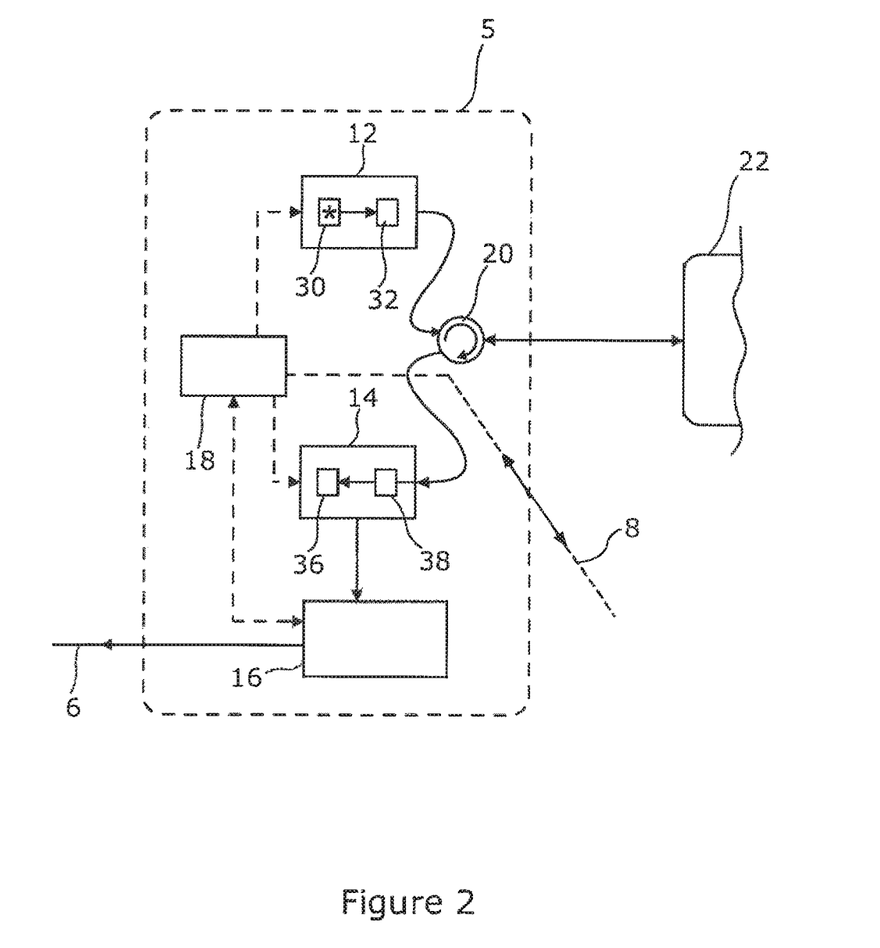
FIG. 2 illustrates an interrogator unit for use in the sensor of FIG. 1.

FIG. 2 illustrates how an interrogator 5a-5d of FIG. 1 could be constructed for the purposes of interrogating the sensing optical fibre to which it is coupled by the optical switch 22 at a particular time. The interrogator 5 includes a probe light source 12 for generating probe light pulses of suitable timing, shape and wavelength, a detector 14 for detecting probe light resulting from the probe light pulses being backscattered within a connected one of the sensing optical fibres 10a-10d, and an analyser 16 for processing data, such as properties of the backscattered and detected light, which has been received from the detector 14.

Each probe light source 12 forms probe light pulses which are forwarded to an optical circulator 20 and from there on to the optical switch 22. The optical switch 22 is arranged to couple each probe light pulse into a selected one of the sensing optical fibres 10a-10d, and to couple at least some of the corresponding backscattered light back to the optical circulator 20 for delivery to the detector 14. A controller 18 provides any necessary local control of operation of the probe light source 12 such as controlling any desired combination of length, timing, power and frequency of the probe light pulse, and similarly controlling the detector 14 as required, and providing control data to the analyser 16 to enable effective analysis of the backscattered light. The controller 18 may also receive signals or data from the analyser 16, for example to control timing of the probe light source 12, or detector 14 based on properties of the detected backscattered light or parameters derived therefrom. The analyser 16 generates and outputs raw analysis results based on the detected backscattered light, such as a determined time series of backscatter intensity for subsequent further analysis by signal processing elements of the one or more management units 7, and these results are output from the interrogator as data stream 6. Control of the interrogator by a management unit 7 is effected by an interrogator control signal 8, and this control signal can also be used to send data relating to the operation of the interrogator back to the management unit 7.

Each probe light source 12 contains one or more laser sources 30 to generate the probe light pulses. The probe light pulses are conditioned in the probe light source by one or more source optical conditioning components 32.

Each detector 14 contains one or more detector elements 36 to detect backscattered light from the probe light pulses in the sensing optical fibres 10a-10d. The detector elements 36 may be, for example, suitable photodiodes. The backscattered light is conditioned in the detector using one or more detector optical conditioning components 38. The optical conditioning components 32, 38 in the probe light source 12 and in the detector 14 may include optical amplifiers, band pass filters, and other components.

A variety of optical interrogation techniques may be used by the sensor to sense the environments 7 around the sensing optical fibres, for example depending on the physical parameters which are to be measured, and the probe light source 12, detector 14, sensing optical fibres 10a-10d and other components of the sensor 2 may be adapted accordingly. For example, the sensing optical fibres may be interrogated using techniques known in the prior art based on Rayleigh backscatter, coherent Rayleigh noise, Raman scattering, and Brillouin scattering. In some embodiments all of the sensing fibres are interrogated using the same technique, or the same combination of techniques, and in other embodiments different techniques or combinations of techniques are used on some or all of the sensing fibres. The sensor may use selected ones of these techniques as appropriate to measure parameters such as vibration, static or transient strain, temperature, and pressure.

Some embodiments of the invention are adapted to measure acoustic vibrations, as a function of position concurrently along each of the sensing optical fibres 10a-10d, from properties of the probe light backscattered within the fibres, and detected at the detectors 14. Acoustic vibration as a function along a particular sensing optical fibre can be detected using persistent coupling to a particular interrogator. However, if a suitably fast optical switch 22 is used then the optical switch may be used to rapidly switch the coupling of a sensing optical fibre between two or more interrogators, with the desired acoustic signal being constructed by interleaving outputs from the two or more interrogators. Similarly, coupling between two or more fibres and a single interrogator may be achieved by suitably fast switching between those sensing optical fibres.

Vibration may be measured from the backscattered light in various ways, for example by detecting the effect of variations in refractive index of a sensing optical fibre, induced by the physical forcing of the vibration, on the coherent Rayleigh noise profile of the backscattered light. This may be achieved using probe light pulses of limited bandwidth. Such Rayleigh noise profiles arise from interference between the many components of the backscattered light originating from different points along a portion of the sensing optical fibre illuminated by the optical source. Such techniques are described, for example, in WO2008/056143.

Parameters such as temperature, pressure and strain may also be measured from the backscattered light in various ways, for example as discussed in 'Polarimetric distributed optical fibre sensing' by A. J. Rogers in Optical Fiber Sensor Technology, Vol. 3, edited by K. T. V. Grattan and B. T. Meggitt, Kluwer Academic Publishers, London, 1998.

Some typical environments in which the sensing optical fibres may be disposed include: along one or more well bores such as oil or gas wells; along or about parts of a built or engineered structure such as a bridge, a pipeline, a road, a railway, a boundary fence or a building; along or within the ground; along tunnels; and along electrical power lines. Various such uses are discussed in 'Recent progress in distributed fiber optic sensors', X. Bao and L. Chen, Sensors 2012, Vol. 12, pp. 8601-8639; doi:10.3390/s120708601.

The number of sensing optical fibres for coupling using the optical switch may vary widely between different implementations, for example being typically between about two and thirty.

As mentioned above, each of the sensing optical fibres 10a-10d may be of a variety of different types and details of construction and manufacture. The sensing optical fibres may therefore have rather different properties such as rates of attenuation (for example typically from about 0.1 to 1.0 dB/km), local variations in birefringence (for example with a beat length from about 1 mm up to 20 m or more), and may require interrogating to different distances away from the interrogator, for example over fibre lengths of just a few hundred metres up to several kilometres. The different sensing optical fibres may pass through similar or different environments, and in particular may have been installed at different times, have been subject to different conditions giving rise to different rates of degradation, and have been subject to different potential damage due to stress, heat, impacts, and in various other ways.

By way of example, sensing optical fibres may have been introduced into different parts of an oil well network over a period of several months or years as parts of the network were commissioned, and have different manufactured specifications depending on the needs envisioned at the times of commission. These sensing optical fibres may then have been subject to different conditions of temperature and pressure depending primarily on depth, different conditions of strain and vibration, and possibly different types of chemical and similar environmental degradation depending on the ways in which the optical fibres are shielded or housed and the surrounding environment.

Therefore, the optimal requirements for interrogating a particular sensing optical fibre coupled to the optical switch 22 may differ from fibre to fibre, and may change over time. Some of the sensing optical fibres may benefit from or require an interrogator having higher optical gain, being capable of a higher signal to noise ratio, having a more powerful probe light source, being less sensitive to strong reflections of the probe light pulses within the sensing optical fibre back to the interrogator, capable of providing better linearity with respect to the parameter being monitored, and providing a better calibrated response for example by measuring optical phase changes with reduced or essentially no ambiguity. Others of the sensing optical fibres coupled to the optical switch 22 may be more easily interrogated using an interrogator without such advantageous properties which may therefore be simpler, cheaper, more robust, more compact, have lower operational power consumption, or have other desirable properties.

Similarly, the interrogators 5a-5d may themselves be subject to variation in performance over time, becoming faulty in some way, for example resulting in: a reduction or fluctuations in the optical power of output probe light pulses; an increase in noise in the determined signal representing the received backscattered light; probe light source wavelength instability; or failing altogether.

Figure 3A:
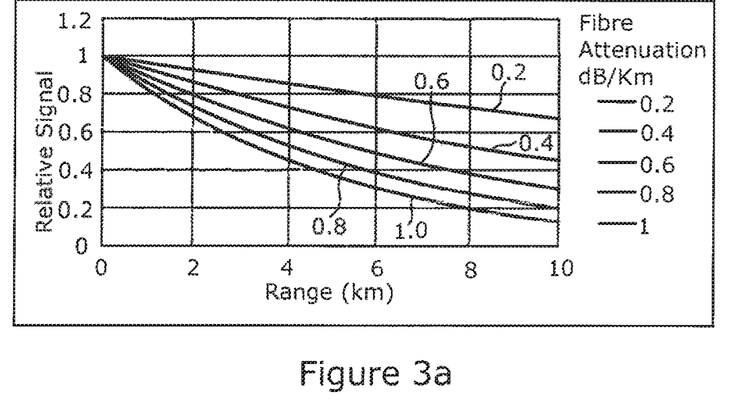
FIGS. 3a to 3c show the effects on a backscatter signal of increasing fibre attenuation, decreasing power of probe light signal injected into the sensing optical fibre, and a localised defect in a sensing optical fibre.
Figure 3B:
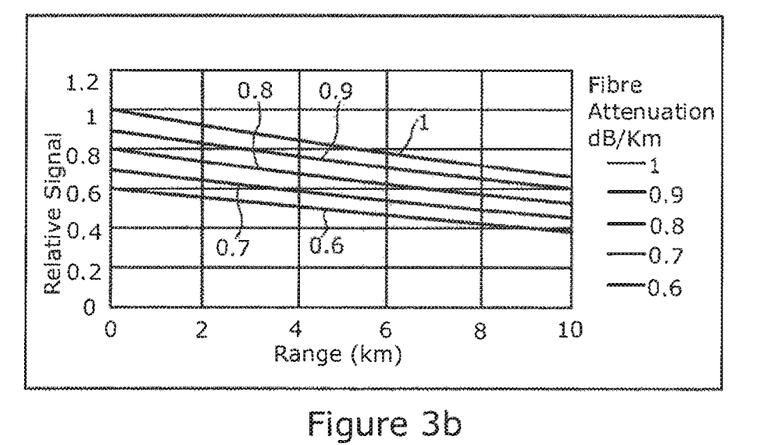
Figure 3C:
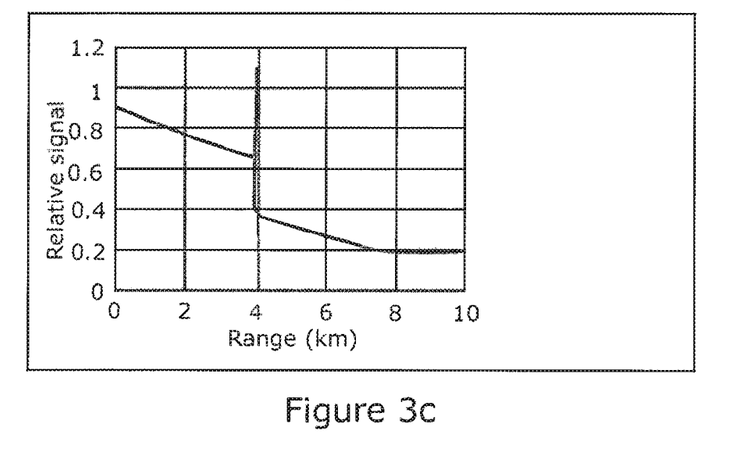

By way of example, FIGS. 3a-3c show how a Rayleigh backscatter signal detected at an interrogator 5 might change depending on various factors. In FIG. 3a, the curves show the power of the backscatter signal due to backscatter in a sensing optical fibre over a range of distances away from the interrogator along the fibre, under different conditions of fibre attenuation ranging from 0.2 dB/km to 1.0 dB/km. The fibre attenuation in sensing optical fibres is known to have a tendency to increase over time, for example over weeks to years after installation, especially in more hostile environment such as in conditions of high temperature, and conditions of high hydrogen concentration in the environment. Fibres exhibiting strong attenuation may still provide valuable information about the environment around the fibre, such as an acoustic signal in that environment, but may require a more sensitive interrogator especially at longer distances from the interrogator.

FIG. 3b illustrates the effects of changes in the power of the launched probe light pulses. Such changes are known to sometimes occur, particularly over periods of hundreds to thousands of hours of semiconductor laser operation, and may happen gradually or rather quickly, and sometimes may give rise to fluctuations in output power rather than decline only, and may be due to changes in the laser device itself, as well as due to deterioration or changes in the driving circuitry. Interrogators exhibiting a significant loss of output optical power, or which become more poorly coupled to the optical switch, may still provide valuable information about the environment around a coupled sensing optical fibre, but it might be appropriate to use such an interrogator on a sensing optical fibre which requires less sensitivity, such as a fibre of less total length, lower attenuation, or similar.

FIG. 3c illustrates the effect of damage to a sensing optical fibre, for example due to an impact or strain damage, which has given rise to a point defect such as a crack or break, in this case around 4 km from the interrogator. In this example, the defect has given rise to a strong reflection, and a severe diminishment in the backscatter signal from the sensing optical fibre beyond that point due to the loss of optical power in the probe light pulses beyond the defect, but either of these effects could occur alone, and multiple such defects could occur in a single fibre. Fibres exhibiting one or more such defects may still provide valuable information about the environment around the fibre, such as an acoustic signal in that environment, but may require a more complex or otherwise adapted interrogator to cope with the high reflection signal, and/or lower signal power from longer distances from the interrogator.

Figure 4:
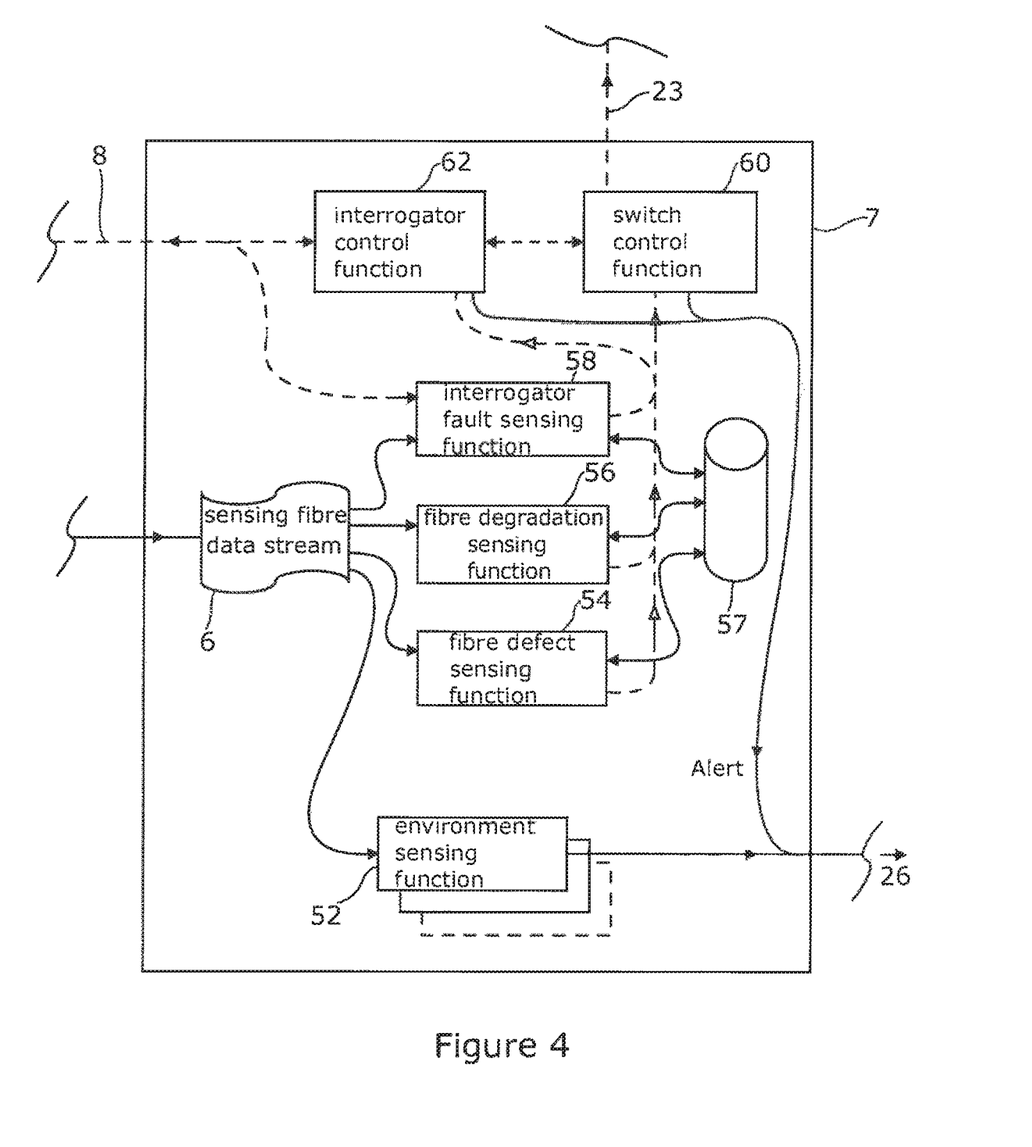
FIG. 4 shows processing functions of a management unit or one or more other processing elements of the sensor of FIG. 1.

FIG. 4 illustrates how a management unit 7 of FIG. 1 may be constructed so as to provide automatic control of the optical switch 22 to adapt for changes in performance of one or more of the sensing optical fibres and/or one or more of the interrogators. One or more data streams 6 received from corresponding one or more interrogators 5 may comprise, for example, data representing the recorded intensity of backscattered light due to each probe light pulse, or such data averaged or otherwise consolidated for a number of pulses. This data may have been processed at the interrogator in various ways before transmission, for example by filtering, normalisation for example to present reduced variation of scale factors between different locations along the fibre, and calibration of optical phase disturbances.

A data stream 6 is analysed in the management unit 7 by signal processing functions or elements comprising one or more analysis functions 54, 56, 58 each arranged to detect a particular condition or group or class of condition of one or more parts of the sensor, and to provide corresponding information to a switch control function 60 and/or an interrogator control function 62 as appropriate, so that these control functions can take appropriate controlling action of the sensor. The response may be to provide an alert to a user, for example using the user interface device 26, and/or to automatically effect control of one or more parts of the sensor in a manner appropriate in response to the detected condition. The switch control function 60 and the interrogator control function 62 may of course be implemented as a single combined function, or as separate functions which preferably are in communication with each other.

Although the example analysis functions shown in FIG. 4 are shown as discrete units, in practice these are likely to be implemented in software using computer functionality of the management unit 7, including using appropriately structured software providing the described functionality. To this end, the or each management unit 7 typically comprises one or more microprocessors, suitably connected volatile and non volatile memory to store and execute such software and to store the associated data, input facilities to receive the data streams 6, and output facilities to provide control signals 23 to the optical switch, to provide and receive control signal to and from and other parts of the sensor such as the interrogator control signals 8, to provide outputs to the user interface device 26, and to receive control signals from a user of the user interface device 26.

Although a variety of different analysis functions may be used, those shown in FIG. 4 include, a fibre defect sensing function 54, a fibre degradation sensing function 56, and an interrogator fault sensing function 58. Additionally, one or more environment sensing functions 52 provide analysis of the data streams 6 to derive and output physical parameters of the environments around the sensors, and/or related data. Typically, such physical parameters may be signals of acoustic vibration or other detected parameters such as pressure, temperature, strain and so forth. However, the environment sensing function(s) 52 may also or instead provide parameters or data derived from such physical parameters such as: fluid flow rates along a conduit along which a sensing optical fibre extends for example as discussed in PCT/GB2011/000789; seismic signatures, signatures of movement of valve drive components, washout of bore casings and related acoustic signatures in oil and other wells for example as discussed in PCT/GB2014/052145, movement of people, vehicles and other entities proximal to a sensing optical fibre, and detections (for example security alerts) of activities such as digging in the ground, third party interference with assets, and intrusion into exclusion zones.

The fibre defect sensing function 54 is arranged to detect defects in one or more of the sensing optical fibres such as the defect illustrated in FIG. 3c. Such defects may give rise to strong reflections of probe light, and/or strong attenuations. For example, the fibre defect sensing function 54 may detect spikes in the backscattered light, or steps in the backscatter signal with respect to distance along the fibre. If such defects are detected the fibre defect sensing function 54 may inform the switch control function 60 and the interrogator control function 62. Actions which these control functions could take in response could be to switch the defective sensing optical fibre to be coupled to an interrogator which is better adapted to handle a strong reflection or large step in intensity caused by the defect, or to instruct the relevant interrogator to switch a period of the backscattered signal containing the strong reflection away from the detector. Another action which the control functions could take would be to replace the connection between an interrogator and the defective fibre with a connection between the interrogator and a replacement fibre already connected to the optical switch, for example a replacement fibre not indicated by the fibre defect sensing function as defective. For example, it may be desirable to couple the interrogator to a replacement sensing optical fibre which resides in the same cable, or follows the same route through the environment, as the defective optical fibre. A past performance database 57 may be used by the fibre defect sensing function to record previously detected defects so that new defects can be better detected and actioned.

The fibre degradation sensing function 56 is arranged to detect degradation in one or more of the sensing optical fibres giving rise to a more distributed increase in attenuation, such as is illustrated in FIG. 3a. Such increases in attenuation could be detected for example by the fibre degradation function storing a periodic average or other suitable record of historic backscatter intensity from each sensing optical fibre of interest in the past performance database 57, for example on a daily or weekly basis. A significant increase in attenuation over part or all of a fibre over such historic records, or over a standard attenuation curve or benchmark for a fibre, may then trigger a response in which the switch control function 60 and/or interrogator control function 62 are requested to take suitable action. Such action could be to instruct the interrogator coupled to the relevant fibre to increase the optical power in the probe light pulses, or to switch the relevant fibre to be coupled to a more sensitive or lower noise interrogator. Another action which the control functions could take would be to replace the connection between an interrogator and the degraded fibre with a connection between the interrogator and a replacement fibre already connected to the optical switch, for example a replacement fibre indicated by the fibre degradation sensing function as not degraded. For example, it may be desirable to couple the interrogator to a replacement sensing optical fibre which resides in the same cable, or follows the same route through the environment, as the defective optical fibre.

The interrogator fault sensing function 58 may detect faults including degradations in functionality, and complete failure, in one or more of the interrogators 5, through one or both of the interrogator control signals 8, and the data streams 6. For example, a significant drop in optical output power of an interrogator may be observed in FIG. 3c as a drop in the backscatter signal in a consistent manner along the whole length of the sensing optical fibre, including at the near end of the fibre, and such a drop could be detected by the interrogator fault sensing function with reference to historical interrogator data stored in the past performance database 57, for example as an average on a daily or weekly basis. Similarly, each interrogator may provide calibration and/or timing data on a periodic or continuous basis as part of the interrogator control signal, and such data can be used, if required with reference to corresponding historic data stored in the past database 57, to detect a fault in an interrogator. If such a fault is detected, corrective action could be taken by one or both of the interrogator control function 62 and the switch control function 60. For example, the interrogator control function could direct an interrogator to perform a recalibration operation, or the switch control function could disconnect the faulty interrogator from a sensing optical fibre to which it is currently connected. If appropriate, for example if the interrogator retains sufficient functionality to be useful, it could be connected to a different sensing optical fibre for which it's level of functionality is sufficient or appropriate.

The architectures of the interrogator units for operations such as distributed sensing of acoustic vibrations may in particular be optimized towards different ones of at least the following features and corresponding interrogator types A-G:

(A) Reflection suppression
(B) Ultra low noise photodetection
(C) Optical phase recovery
(D) Low cost, short range operation
(E) Ultra-long range operation
(F) Short range, high spatial resolution
(G) General purpose operation.

For example, whereas reflection suppression can be achieved by interposing an optical switch within the receiving branch of an interrogator unit, this may reduce the sensitivity of the system, making the interrogator unsuitable for cases where ultra-low noise operation is required. Likewise, measurement of optical phase may require a complex interrogator not compatible with low cost installations.

Table 1 indicates some appropriate interrogator types for different fibre conditions. Broken fibre and strong discrete reflections are typically stronger and weaker cases of fibre defects, while high attenuation may arise from gradual fibre degradation. Using the signal analysis methods described above, together with a decision tree based on table 1 and other pre-programmed operational requirements, management unit(s) 7, for example including the switch control function 60 and interrogator control function 62 of FIG. 4 can then be used to allocate particular interrogators to particular sensing optical fibres.

TABLE 1

| Fibre condition | Interrogator type | | | | | | |
|---|---|---|---|---|---|---|---|
| | A | B | C | D | E | F | G |
| Strong discrete reflection | yes | no | Yes (if also type A capable) | No | No | No | No |
| High attenuation | no | yes | yes | No | yes | yes | No |
| Broken fibre | yes | yes | yes | no | yes | yes | yes |
| Typical fibre | yes | yes | yes | | yes | yes | yes | yes |

The optical switch 22 can be implemented in various ways, depending on particular needs of a detailed implementation of the invention. A crossbar switch, also referred to as a matrix switch, may preferably be used, in which the N lines connected to the interrogators effectively cross over the M lines connected to the sensing optical fibres, and a switch element may be activated at each intersection. In particular, each switch element may be a low-loss passive switch element such as a mirror. Each switch element may be activated or deactivated by a mechanical movement, for example to move the switch element into or out of the intersecting beams. The optical switch 22 may be non-blocking, in the sense that each of the N interrogator lines may be connected to a different one of the M sensing optical fibre lines at the same time (if N<=M, or vice versa if M<=N), and achieve the required switching action flexibly and in a single stage, and at relatively low cost. Such switching arrangements also benefit from producing low levels of reflection at the switch.

Figure 5:
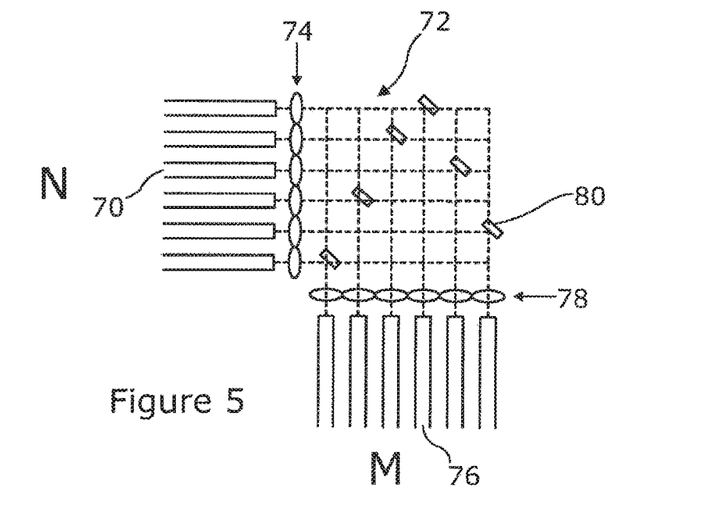
FIGS. 5 and 6 show different ways in which the optical switch of FIG. 1 could be implemented.

To this end, the optical switch may be provided by a non-blocking mechanical optical matrix switch as illustrated in FIG. 5. In this example, N fibre optic connections 70 to N interrogators 5 are coupled into N parallel collimated beam rows of the matrix 72 each by a separate microlens 74. Similarly, M fibre optic connections 76 to M downlead fibres 9 coupled to corresponding sensing optical fibres 10 are coupled into M parallel collimated beam columns of the matrix 72 each by a separate microlens 78. Each row/column intersection of the matrix 72 may then be occupied by a separate oblique mirror element 80, or other low-loss passive switch element, which when in an active position causes optical coupling of the row and column it intersects. When in a null position it does not cause such coupling. Movement between active and null positions may be achieved, for example, by suitable mechanical translation and/or rotational movement driven by suitable actuators which may typically be electromagnetic in nature such as micromotors or solenoids. A suitable non-blocking mechanical matrix switch may be a Series 1000 optical network switch supplied by Polatis, Inc.

A non-blocking matrix switch can also be readily achieved without mechanical action, for example using various solid state switching techniques including electro-optic or magneto-optic effects. Such switches can operate at much higher switching speeds than mechanical switches, but typically incur higher transmission losses, and tend to exhibit reflections from within the switch leading to complications in designing other aspects of the sensor or potentially reduced sensor performance. A suitable non-mechanical switch may be the type EPS0202 or similar provided by EpiPhotonics Corporation.

Figure 6:
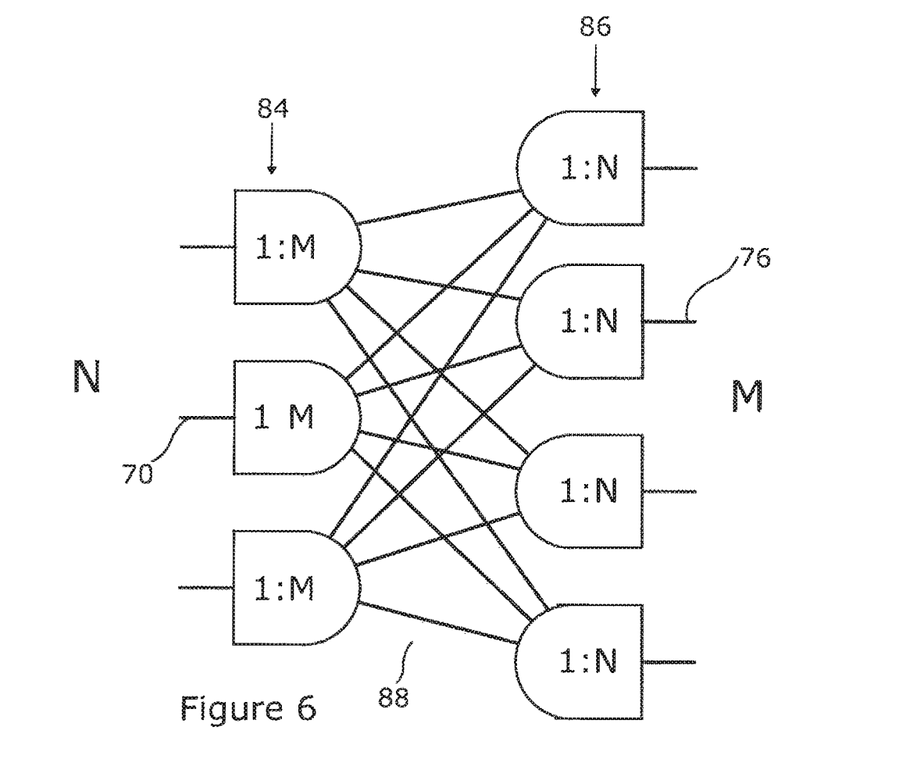

FIG. 6 illustrates a different way of implementing the optical switch 22 in which solid state switches are preferably used, although other types of switches may be used. The interrogator side of the switch comprises N switch elements 84 each with a 1×M configuration, with the single side of each 1×M switch element being coupled to a different interrogator by an optical connection 70. The sensing optical fibre side of the switch comprises M switch elements 86 each with an N×1 configuration, with the single side of each N×1 switch being coupled to a different sensing optical fibre or downlead fibre by a different optical connection 76. The M side of each 1×M switch then provides selectable coupling, via switch interconnections 88, to any one of the N×1 switches, and the N side of each N×1 switch provides selectable coupling to any one of the 1×M switches. Coordinating both the 1×M and N×1 switches enables each of the N interrogators to be coupled to a different one of any of the M sensing optical fibres at the same time (assuming N<=M, or vice versa if M<=N).

The optical switch of FIG. 6 therefore comprises an interrogator switch element (for example a solid state switch element) associated with each interrogator, and a sensing fibre switch element (for example a solid state switch element) associated with each sensing optical fibre. For each interrogator switch element, selectable interconnections are provided to each sensing fibre switch element, and therefore also for each sensing fibre switch element, selectable interconnections are provided to each interrogator switch element, such that the optical switch can selectively and simultaneously couple each of a plurality of the interrogators to each of a plurality of the sensing optical fibres, in a one interrogator to one sensing optical fibre mode. Either all of the interrogators, or all of the sensing optical fibres (whichever is fewer in number) can be connected at the same time, if required.

Suitable 1×N and M×1 switches which may be used for the described purposes include, for example model MX3 switches and similar provided by DiCon Fibreoptics Inc.

Of course, although the optical switch 22 of FIG. 6 is constructed using just two layers of switches, that is an interrogator side layer and a sensing fibre side layer, more layers such as three or four layers could be used with suitable interconnections, and combinations of different numbers of layers could be used for different interconnection pathways.

Various combinations of and intermediates between the possibilities discussed in connection with FIGS. 5 and 6 may also be envisaged and used in embodiments of the invention to provide simultaneous one to one connections between various combinations of interrogators and sensing optical fibres. Such situations might in particular occur when making upgrades or extensions to existing sensor installations.

Using switch arrangements such as that of FIG. 6, it may be necessary to consider the effects of reflections at the switch elements. When multiple switches in a single interrogator—sensing fibre connection produce reflections of the probe light pulses back towards the interrogator which are greater than typical optical signals arising due to the desired backscatter within the sensing optical fibres, and these pulsed reflections are separated by less than half of the length of the optical interrogation pulses, optical interference between the reflected pulses can cause large, unwanted fluctuations in the gain of the receiving components of the interrogators. This can be avoided by providing sufficient optical path lengths, typically implemented using suitable lengths of optical fibre, in the interconnections 88 between the switch layers. A similar technique is described in PCT/GB2015/052071, which is hereby incorporated by reference for all purposes. Since the probe light pulses generated by the interrogators may typically be between about 1 and 10 metres in length while propagating along the sensing optical fibres, to reduce the adverse effects of switch reflections, at least one or more of the optical interconnections between switch elements of different layers may be at least a minimum length, where the minimum length may be for example at least 50 cm, at least 1, 2 or 5 metres, depending for example on the expected pulse lengths. Alternatively, at least one, and optionally all such optical interconnections 80 may be at least as long as one half of the longest pulse length which any of the interrogators connectable via the switch through that interconnection is adapted to generate.

Using solid state switching as described above, or implemented in other ways in switching element 22, rather than using mechanical switching, may also be used to share an interrogator between a plurality of sensing fibres while realising an acceptable interleaving rate between the fibres (for example to maintain a effectively continuous acoustic monitoring of each fibre using a single interrogator) or to monitor a plurality of sensing optical fibres with multiple interrogators. Mechanical switch elements are unlikely to be able to meet either the rapid switching speeds or the high number of switching cycles with good reliability needed for interleaving purposes, although use of piezo electric driven switching may be an option.

In FIG. 1, the one or more management units 7 are depicted as a single computer element typically comprising one or more microprocessors, suitably connected volatile and non volatile memory to store the required software and associated data, and so forth, although multiple such computing elements could also be used. For example, a separate management unit 7 could be used in respect of each of one or more of the interrogators 5. As illustrated in FIG. 4 it was also proposed above that a management unit 7 could comprise both signal processing and analysis functionality, for example the fibre defect sensing function 54, fibre degradation sensing function 56, interrogator fault sensing function 58, and one or more environment sensing functions 52 depicted in that figure, as well as control and supervisory functions such as the switch control function 60 and interrogator control function 62 depicted in that figure.

Figure 7:
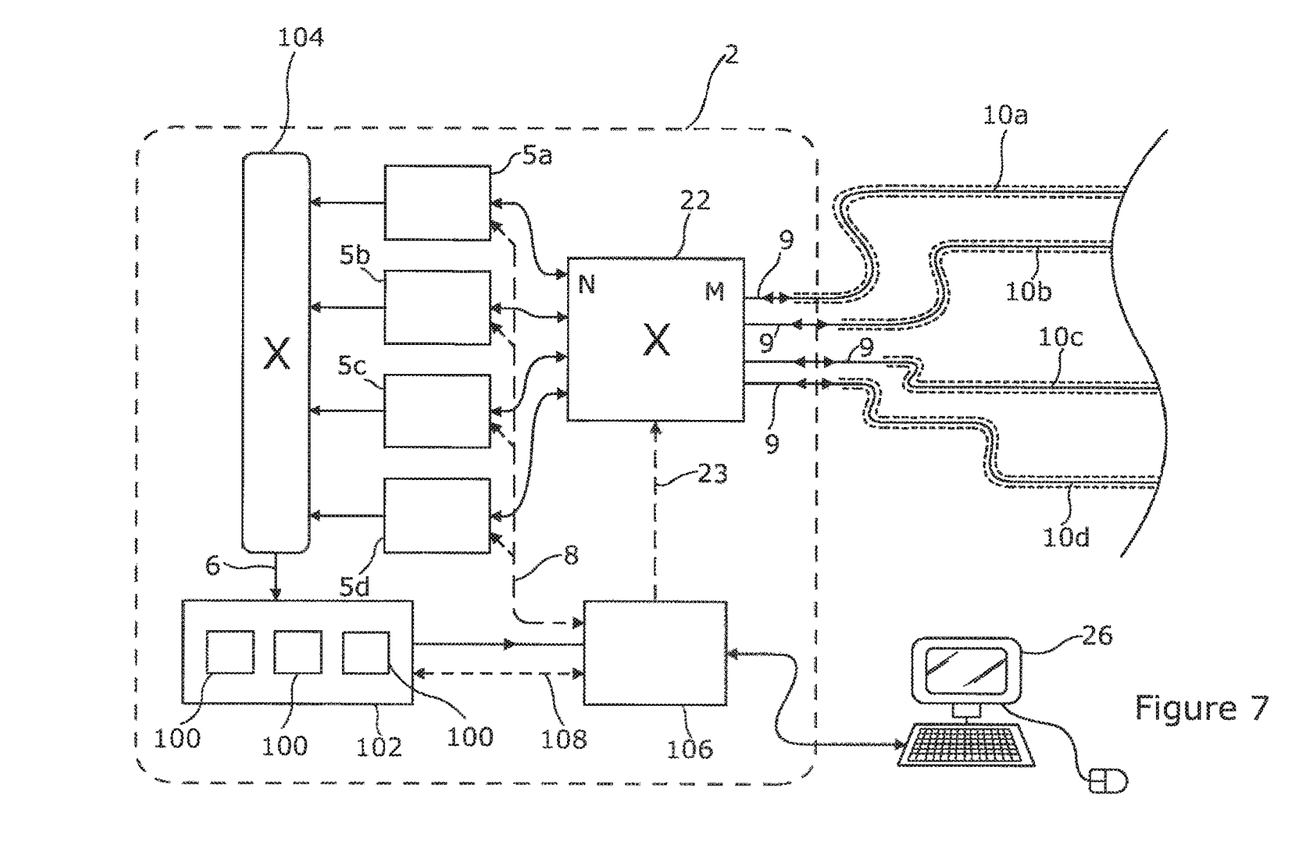
FIG. 7 shows schematically options for implementing signal processing functions.

FIG. 7 illustrates other ways in which some or all of the functionality of the management unit(s) 7 discussed above may be provided. For example, instead of using separate hardware management units, the analysis functionality comprising signal processing to interpret the backscatter data may be provided by using a plurality of virtual signal processing machines 100 executing within a virtual processor environment 102, for example implemented using a version VMWare® or another virtualisation environment. Since the data rate from a single interrogator may easily exceed 600 MB/second, the data streams 6, comprising the backscatter data from the interrogators 5 to the virtual signal processing machines 100 or other management units, may be routed to the virtual processor environment and/or separate signal processors or processing units using suitable data switching facility or facilities 104, for example which provides one or more high speed data links between the interrogators and signal processing elements. Such switching facilities could for example comprise one or more data networking switches. The data switching facility can then be used to reroute data streams from particular interrogators to different signal processing machines for example in the event of changes in signal processing requirements, the number and type of interrogators in operation, failure of one or more of the signal processing machines or computer hardware or software providing signal processing functions, and similar.

In the arrangement of FIG. 7 the required control functions are then included in a control and supervisory element 106, which may carry out the roles of the switch control function 60 and interrogator control function 62 already depicted in FIG. 4. If required, the control and supervisory element 106 could be implemented, as depicted in FIG. 7, using a separate computing element, or of course it could be included as software executing on one or more virtual processors within the virtual processing environment 102.

The implementation of the signal processing functionality of the data stream analysis functions on virtual machines as shown in FIG. 7 can therefore be implemented on generic hardware platforms. Such virtual machines could be created and configured remotely to meet the requirements of any particular application, allowing great convenience in system design, maintenance and upgrading. Overall system management, including interrogator health monitoring and control, optical switch setting and sequencing, processor configuration and resource allocation can be accomplished using system management software with a human interface module such as the user interface device 26 for example through a further control connection 108 between the control and supervisory element 106 and the virtual processor environment 102.

Various modifications may be made to the described embodiments without departing from the scope of the invention, which is defined by the claims. For example, although the techniques described above have been largely illustrated in the context of OTDR (optical time domain reflectometry) and DOFS (distributed optical fibre sensor) arrangements used to detect acoustic or vibrational signals, they may be advantageously used in any optical fibre sensing system where multiple sensing optical fibres and multiple interrogator units are required.

The invention claimed is:

1. A distributed optical fibre sensor for sensing an environment, as a function of position along each of a plurality of sensing optical fibres passing through the environment, from properties of probe light backscattered within the sensing optical fibres, the sensor comprising:
   a plurality of interrogators, each interrogator comprising a probe light source arranged to generate pulses of probe light for transmission to a sensing optical fibre coupled to the interrogator, and a detector arranged to receive and detect probe light backscattered within the sensing optical fibre and being arranged to output a signal corresponding to the detected probe light;
   a plurality of signal processors, each signal processor arranged to receive an output signal from one or more of the plurality of interrogators, and to derive from the output signal one or more parameters of the environment proximal to the coupled sensing optical fibre; and
   a data switching facility arranged to couple the plurality of interrogators to the plurality of signal processors,
   wherein the distributed optical fibre sensor is further arranged to automatically reroute a signal from a particular interrogator, from being directed to a current signal processor to being directed to a different signal processor, using the data switching facility.

2. The distributed optical fibre sensor of claim 1 further comprising a virtual processor environment, and wherein the plurality of signal processors are provided using virtual processors in the virtual processor environment.

3. The distributed optical fibre sensor of claim 1 further comprising an optical switch arranged to selectively and simultaneously couple each of a plurality of the interrogators to each of a plurality of the sensing optical fibres such that probe light pulses from each coupled interrogator are directed into the correspondingly coupled sensing optical fibre, and backscattered probe light from the sensing optical fibre is directed back to the correspondingly coupled interrogator.

4. The distributed optical fibre sensor of claim 1 wherein each sensing optical fibre is deployed, for sensing the environment, within a separate fibre optic cable disposed within the environment.

5. The distributed optical fibre sensor of claim 4 wherein each fibre optic cable is deployed, at least partly, along a different path through the environment than the other fibre optic cables, so as to sense the environment in different parts of the environment than each of the other fibre optic cables.

6. The distributed optical fibre sensor of claim 4 comprising at least three said fibre optic cables.

7. The distributed optical fibre sensor of claim 1 arranged to derive the one or more parameters of the environment as one or more concurrent functions of position along each of one or more of the sensing optical fibres, using coherent Rayleigh profiles of the backscattered probe light from each sensing optical fibre.

8. The distributed optical fibre sensor of claim 1 arranged to derive the one or more parameters of the environment as one or more concurrent functions of position along each of one or more of the sensing optical fibres, using one or more of Rayleigh, Raman, and Brillouin backscattered probe light from each sensing optical fibre.

9. The distributed optical fibre sensor of claim 1 wherein the derived one or more parameters of the environment comprise acoustic vibration at one or more of the sensing optical fibres.

10. The distributed optical fibre sensor of claim 1 wherein the derived one or more parameters of the environment comprise one or more of temperature, pressure, vibration, and strain at one or more of the sensing optical fibres.

11. A method of operating a distributed optical fibre sensor to sense an environment as a function of position along each of a plurality of sensing optical fibres, from properties of probe light backscattered within the sensing optical fibres, comprising:
   generating, using each of a plurality of interrogators, pulses of probe light for transmission from each interrogator to a different coupled sensing optical fibre;
   receiving, using each interrogator, probe light backscattered in response to probe light propagating within the sensing optical fibre coupled to that interrogator;
   outputting, by each interrogator, a signal corresponding to the probe light received by that interrogator;
   receiving, by each of a plurality of signal processors, the output signal from one or more of the plurality of interrogators;
   deriving, by each of the plurality of signal processors from the corresponding received output signal, one or more parameters of the environment proximal to the corresponding sensing optical fibre;
   coupling the plurality of interrogators to the plurality of signal processors using a data switching facility; and
   automatically rerouting a signal arriving at the data switching facility, using the data switching facility, from being directed to a current signal processor to being directed to a different signal processor.

12. The method of claim 11 further comprising receiving, by each signal processor, the output signal from a different one of the plurality of interrogators.

13. The method of claim 11 further comprising executing the plurality of signal processors as virtual processors in a virtual processor environment.

14. The method of claim 11 wherein deriving from the received output signal one or more parameters of the environment comprises deriving one or more such parameters as concurrent functions of position along each of one or more of the sensing optical fibres using coherent Rayleigh profiles of the backscattered probe light.

15. The method of claim 11 wherein deriving from the received output signal one or more parameters of the environment comprises deriving one or more such parameters as concurrent functions of position along each of one or more of the sensing optical fibres using one or more of Rayleigh, Raman and Brillouin backscattered probe light.

16. The method of claim 11 wherein the one or more parameters comprise acoustic vibration.

17. A distributed optical fibre sensor for sensing an environment, as a function of position along each of a plurality of sensing optical fibres passing through the environment, from properties of probe light backscattered within the sensing optical fibres, the sensor comprising:
 a plurality of interrogators, each interrogator comprising a probe light source arranged to generate pulses of probe light for transmission to a sensing optical fibre coupled to the interrogator, and a detector arranged to receive and detect probe light backscattered within the sensing optical fibre and being arranged to output a signal corresponding to the detected probe light;
 a plurality of signal processors, each signal processor arranged to receive an output signal from one or more of the plurality of interrogators, and to derive from the output signal one or more parameters of the environment proximal to the coupled sensing optical fibre; and
 an optical switch arranged to selectively and simultaneously couple each of a plurality of the interrogators to each of a plurality of the sensing optical fibres such that probe light pulses from each coupled interrogator are directed into the correspondingly coupled sensing optical fibre, and backscattered probe light from the sensing optical fibre is directed back to the correspondingly coupled interrogator.

18. The distributed optical fibre sensor of claim 17 further comprising a virtual processor environment, and wherein the plurality of signal processors are provided using virtual processors in the virtual processor environment.

19. The distributed optical fibre sensor of claim 17 wherein each sensing optical fibre is deployed, for sensing the environment, within a separate fibre optic cable disposed within the environment.

20. The distributed optical fibre sensor of claim 17 arranged to derive the one or more parameters of the environment as one or more concurrent functions of position along each of one or more of the sensing optical fibres, using coherent Rayleigh profiles of the backscattered probe light from each sensing optical fibre.

* * * * *